Figure 1:
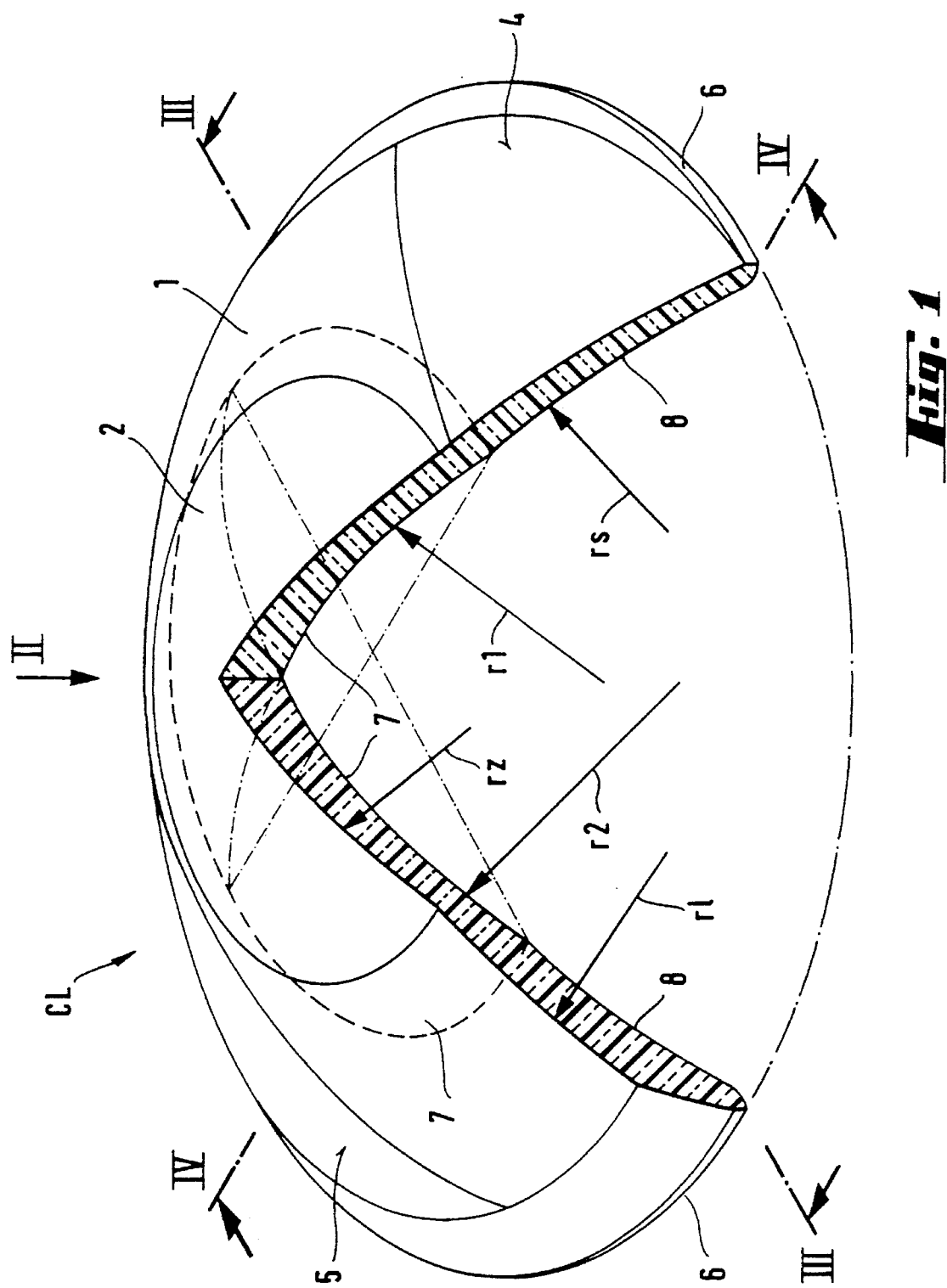

United States Patent [19]
Hahne et al.

[11] Patent Number: 5,455,641
[45] Date of Patent: Oct. 3, 1995

[54] SOFT CONTACT LENS HAVING TORIC REAR FACE AND ROTATIONALLY SYMMETRICAL FRONT FACE

[75] Inventors: Christoph Hahne, Essen; Peter Höfer, Aschaffenburg; Willi Hörner, Sulzbach; Martin Reichner, Aschaffenburg, all of Germany

[73] Assignee: Ciba-Geigy Corporation, Ardsley, N.Y.

[21] Appl. No.: 361,896

[22] Filed: Dec. 22, 1994

Related U.S. Application Data

[63] Continuation of Ser. No. 48,154, Apr. 15, 1993, abandoned.

[30] Foreign Application Priority Data

Apr. 23, 1992 [EP] European Pat. Off. ............ 92810295

[51] Int. Cl.⁶ ........................................ G02C 7/04
[52] U.S. Cl. .................... 351/160 H; 351/161; 351/176
[58] Field of Search ................ 351/160 R, 160 H, 351/161, 162, 177, 176

[56] References Cited

U.S. PATENT DOCUMENTS

| | | | |
|---|---|---|---|
| 3,670,460 | 6/1972 | Oldfield . | |
| 4,068,413 | 1/1978 | Suddarth | 51/55 |
| 4,095,878 | 6/1978 | Fanti | 351/161 |
| 4,155,962 | 5/1979 | Neefe | 264/1 |
| 4,256,369 | 3/1981 | Wichterle | 350/160 |
| 4,508,436 | 4/1985 | Sitterle | 351/160 |
| 5,069,542 | 12/1991 | Höfer | 351/160 |

FOREIGN PATENT DOCUMENTS

| | | | |
|---|---|---|---|
| 062178 | 10/1982 | European Pat. Off. | G02C 7/04 |
| 440107A | 7/1991 | European Pat. Off. | G02C 7/04 |
| 2425088 | 11/1979 | France | G02C 7/04 |
| 89/07303 | 10/1989 | WIPO | G07C 7/04 |

Primary Examiner—David C. Nelms
Assistant Examiner—Vu Le
Attorney, Agent, or Firm—Edward McC. Roberts; R. Scott Meece

[57] ABSTRACT

The soft toric contact lens has a substantially rotationally symmetrical front face optionally having a rotationally symmetrical lenticular construction, and a substantially aspherical, especially ellipsoidal, rear face. The optically active central region of the rear face is toric. Shifting the torus to the central region of the lens rear face results in lenses that are economic to produce, are of wearable thickness and are straightforward to fit.

9 Claims, 4 Drawing Sheets

SOFT CONTACT LENS HAVING TORIC REAR FACE AND ROTATIONALLY SYMMETRICAL FRONT FACE

This application is a continuation of application Ser. No. 08/048,154, filed Apr. 15, 1993, abandoned.

The invention relates to a soft toric contact lens for the correction of pure astigmatism and astigmatism combined with spherical sight defects in accordance with the preamble of the independent claim.

In contrast to dimensionally stable so-called hard contact lenses, so-called soft contact lenses consist of a flexible material and, when worn, fit snugly on the cornea and sclera of the eye. This fundamentaly different behaviour of hard and soft contact lenses has implications for the design and manufacture of contact lenses.

A tried and tested process for the manufacture of soft contact lenses is the so-called half-mold process (see e.g. U.S. Pat. No. 4,155,962), which is a molding process in which only the rear face of the contact lens is given its definitive shape, whilst the front face is produced by machining the molding subsequent to the casting process. The machining process used is usually the so-called Fly-Cut process (see e.g. U.S. Pat. No. 3,670,460 or U.S. Pat. No. 4,068,413) in which a cutting tool is rotated at a predetermined distance about a first axis and simultaneously displaced by rotation about a second axis, which is perpendicular to the first, at a likewise predetermined distance.

From the optical point of view, the toric lens surface necessary for correcting cornea astigmatism can, in principle, be arranged or formed either at the front side of the contact lens remote from the eye, or at the rear side facing the eye. In the case of soft contact lenses the toric lens face is usually the front face. Contact lenses are also already known that have a toric rear face which is in the form of a negative to or is complementary to the cornea to be treated. Those contact lenses are, however, problematic and disadvantageous in various respects. For example their ability to move on the eye is inadequate, they reduce underwashing with lacrimal fluid, they require complicated fitting necessitating the use of specimen lenses that are toric on the inside and, in severe cases, they also require a toric front face as a result of an induced residual astigmatism.

The manufacture of soft toric contact lenses having a medium or high negative total refractive power by means of the mentioned half-mold process and the Fly-Cut process is today easy to control and well tested. Difficulties arise, however, in the case of low negative and especially of positive total refractive power. If the toric front face of such contact lenses is to be produced in the conventional Fly-Cut process, then the result is lenses that are so thick that it is not possible for those lenses to be worn in practice. Lenses of impractical thickness are usually avoided by a lenticular construction in which the contact lens has the required thickness only in its optically active central region, while its peripheral region is substantially thinner. Such toric contact lenses having a (toric) lenticular construction cannot, however, be produced by the tested Fly-Cut process but require expensive special processes, which in turn are again associated with a number of disadvantages (inaccuracy, poor reproducibility etc.) and which, in particular, do not allow economic production.

One aim of the present invention is therefore to provide a soft toric contact lens for the entire refractive value range which, even in the case of positive total refractive power and with lenticular construction, can be manufactured economically and, in addition, offers the comfort of wear of modern contact lenses having ellipsoidal rear faces. A further aim of the invention is the provision of a soft toric contact lens that can be fitted substantially without special fitting lenses and with as small as possible a number of standard values for the cylindrical correction.

According to the most general concept of the invention, the aims of the invention are achieved by shifting the correction of the cornea astigmatism to the optically active central region of the rear face of the contact lens, thus applying the toric lens face in that central region of the contact lens rear face, the central region generally having a mean diameter of about 5 mm to 14 mm. (That optically active central region of the rear face is an approximately oval region of which the smallest and largest dimensions are about 5 mm and about 14 mm respectively). By limiting the toric face to the mentioned central region of the contact lens rear face, the shape of the peripheral region thereof can be optimised with respect to comfort of wear and other aspects. Especially expedient and advantageous is the substantially ellipsoidal shape of the rear face known per se from spherical contact lenses (see U.S. Pat. No. 5,069,542), with its inherent advantages such as, e.g., good movability, extremely good immediate and long-term comfort of wear, good underwashing with lacrimal fluid, thus ensuring the best physiological conditions, only two or few geometries (flat or steep fitting), etc. . . .

The concept according to the invention of shifting the torus to the central region of the contact lens rear face is based on the surprising discovery that the rear face torus or the difference in radius of the rear face torus from the cornea torus is transferred on account of the softness of the contact lens material to the front face of the contact lens, where it at least to some extent exhibits the same optical action as an original front face torus, but without the manufacturing problems and other disadvantages thereof.

The contact lens according to the invention, which achieves the aims set out above, is distinguished by the features given in the independent claim. Preferred arrangements and further developments are disclosed in the dependent claims.

The stabilisation of the orientation of the contact lens on the eye is preferably carried out dynamically in a manner known per se by blinking, for which purpose the contact lens is provided at the front side in its upper and/or lower region with a flattened stabilisation zone (see U.S. Pat. No. 4,095,878). In that case the rear face torus in the central region assists the dynamic stabilisation by interaction with the cornea. By limiting the toric face to the central region of the contact lens rear face, the afore-mentioned considerable disadvantages of contact lenses having a completely toric rear face are entirely avoided.

A considerable advantage of the contact lens according to the invention is that the front face may be of purely rotationally symmetrical shape or, in the case of a positive total refractive power, may have a rotationally symmetrical lenticular construction, so that the manufacture of the contact lens is in each case economic. Furthermore, the contact lenses according to the invention are sufficiently thin even in the case of low negative and especially in the case of positive total refractive powers.

It has also been demonstrated that the contact lens according to the invention can be fitted in the most simple manner using only two measuring lenses; a special fitting set is not necessary since the basic geometry required for stabilisation (edge thickness difference etc.) is the same for each lens. On account of the use of only two cylindrical values (preferably approximately minus 1 cyl and minus 1.75 cyl) for the rear face torus, a minimal amount of stock is required where direct dispensing is practised, that is to say, the number of lenses in a contact lens sales set stays within economic limits. Also, only two or a few different standard values are known to be necessary for the geometries of the ellipsoidal peripheral rear face region of the contact lens (see U.S. Pat. No. 5,069,542).

Figure 2:
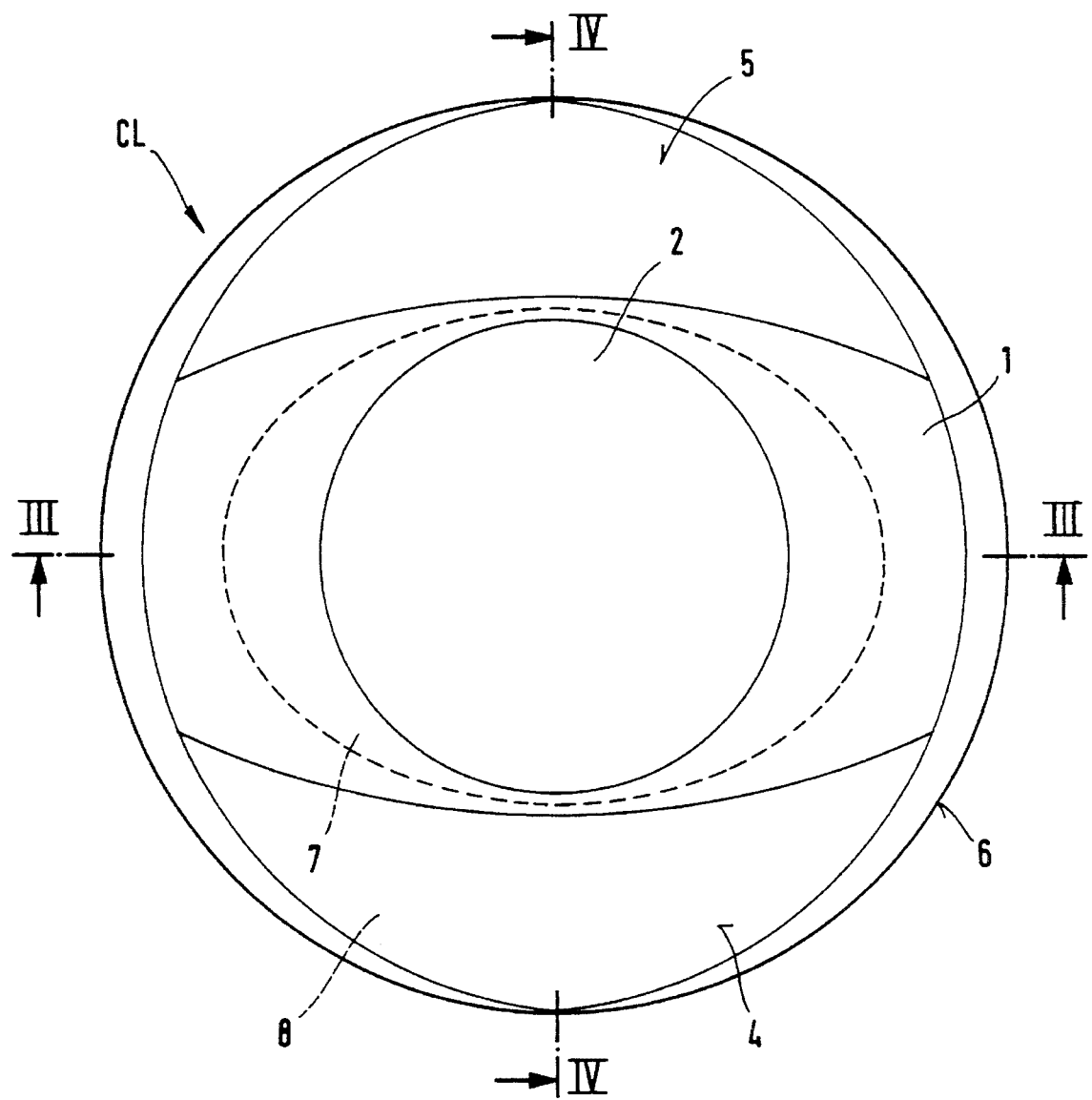
Figure 3:
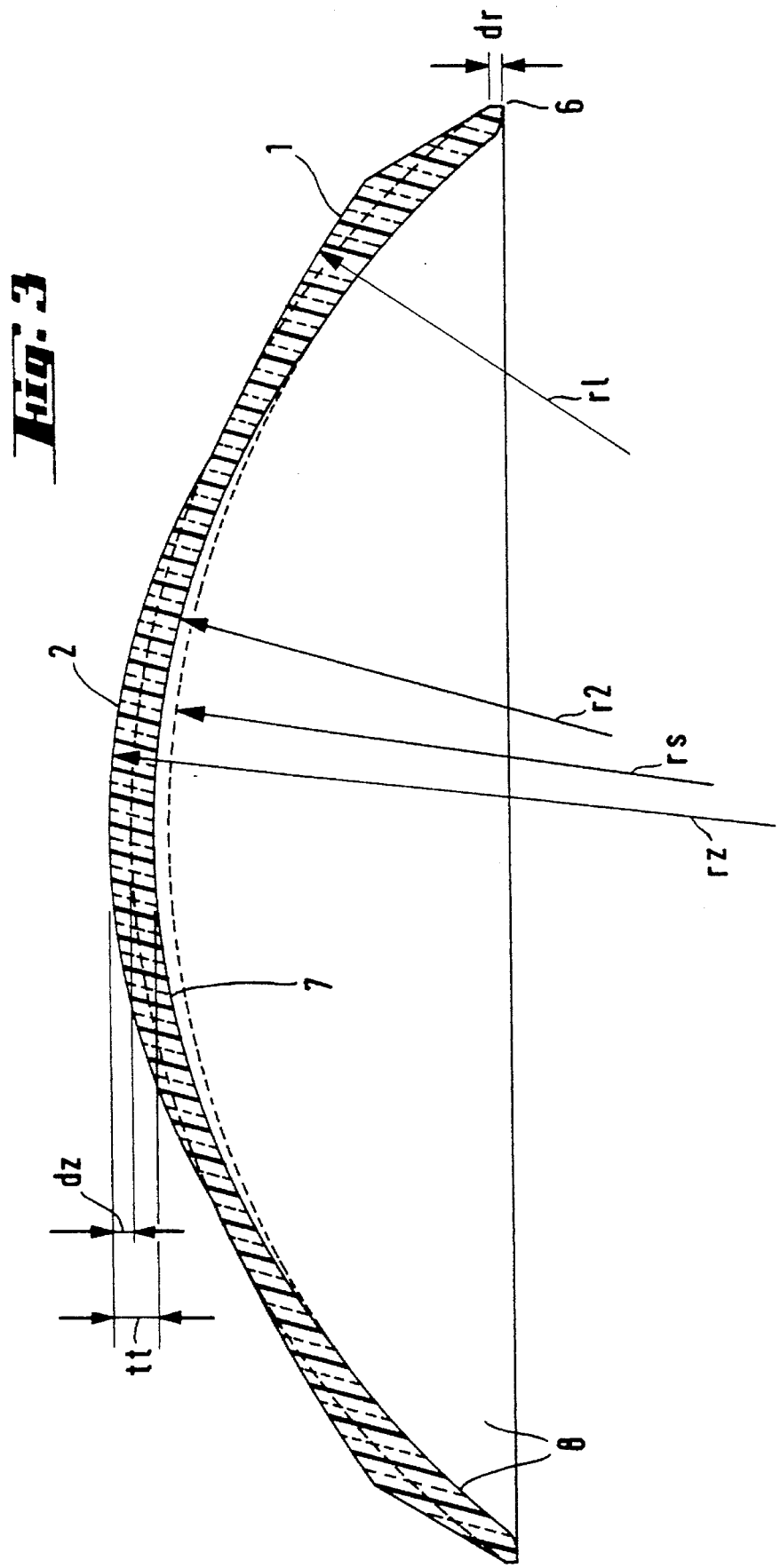
Figure 4:
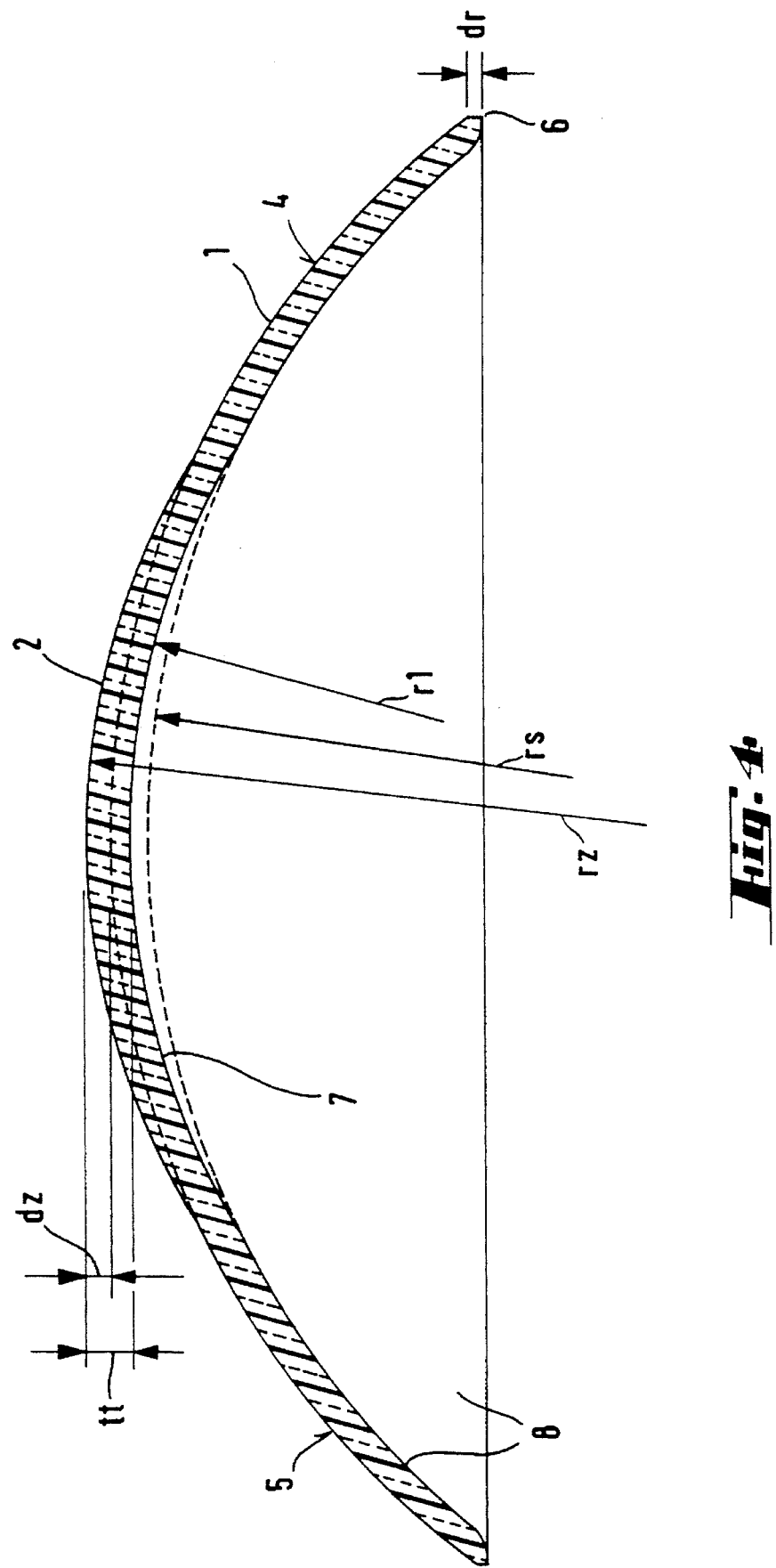

In the following, a contact lens according to the invention is explained in detail by way of example with reference to the drawings of which FIG. 1 is a partially cut-open contact lens according to the invention in a perspective view, FIG. 2 is a top view of the lens of FIG. 1, FIG. 3 is a section along the line III—III of FIG. 2 and FIG. 4 is a section along the line IV—IV of FIG. 2.

The contact lens, indicated as a whole by CL, has a substantially rotationally symmetrical front face, which is composed of a rotationally symmetrical optically active central region 2 and a likewise rotationally symmetrical (spherical or aspherical) lenticular region 1, and two flattened, approximately crescent-shaped stabilisation zones 4 and 5 lying opposite each other at the 12 o'clock and 6 o'clock positions. The contact lens also has a somewhat thinner narrow edge region 6. The rear face of the contact lens CL which faces the eye is divided into an optically active central region 7 and a peripheral region 8 that surrounds the latter.

The example embodiment shown of the contact lens according to the invention has a positive total refractive power. Lenses having negative total refractive power have a minus lenticular construction in order that they become thinner towards the edge.

The stabilisation zones 4 and 5 correspond in design and action to conventional zones of that kind, for example as described in U.S. Pat. No. 4,095,878.

The material from which the soft contact lens according to the invention is made is conventional. The following materials, for example, may be used: tefilcon (38%)(Dk=8), hefilcon A&B (43%)(Dk=12), xylofilcon A (67%)(Dk=29), scafilcon A (71%)(Dk=30), deltafilcon A (43%)(Dk=10), ocufilcon (44%)(Dk=16), etafilcon A (58%)(Dk=20), vifilcon A (55%)(Dk=16).

According to the main concept of the invention, the toric lens face necessary for the correction of cornea astigmatism is arranged in the central region 7 of the lens rear face. The peripheral region 8 of the lens rear face surrounding the central region is of aspherical, preferably ellipsoidal, shape, with the geometry described e.g. in U.S. Pat. No. 5,069,542. The advantages described hereinbefore with regard to lens thickness, ease of manufacture and comfort of wear are achieved by that feature.

The optically effective, toric central region 7 of the lens rear face has a mean diameter of about 5 mm to about 14 mm and has an oval flat shape.

A contact lens set assembled using the contact lenses according to the invention will cover a wide supply range with only a few different cylindrical values of the toric central region 7 of the contact lens rear face. In practice, two values of about minus 1 cyl and minus 1.75 cyl have proved to be adequate for most cases. In the case of an ellipsoidal shape of the peripheral region 8 of the lens rear face according to U.S. Pat. No. 5,069,542, similarly only two geometries are sufficient, one for so-called flat fitting and one for so-called steep fitting. In total, therefore, a lens set assembled using the contact lenses according to the invention needs to include only relatively few different contact lenses, which obviously is very economical and desirable.

The date of one example of a contact lens are as follows:

Radius of curvature r1 of the spherical lenticular region 1: 10.84 mm

Edge thickness dr: 0.0835 mm

Radius of curvature rz of the spherical central region 2 of the lens front face: 8.35 mm Total thickness tt of the contact lens on the optical axis: 0.206 mm Thickness ("superelevation") dz of the central region 2 on the optical axis: 0.100 mm Radius of curvature rs at the apex of the ellipsoidal peripheral region 8 of the lens rear face: 8.90 mm Numerical eccentricity e of the ellipsoidal region 8: E=0.4

Radius of curvature r1 of the first main meridian of the toric central region 7 of the lens rear face: 8.485 mm Radius of curvature r2 of the second main meridian: 8.861 mm Refractive power: spherical: +3.00 cylindrical: −1.75

Lens material: methyl methacrylate/vinylpyrrolidone copolymer with 60% water content, such as, for example, the lens "Weicon CE" produced by CIBA-Vision GmbH, Aschaffenburg, Germany.

What is claimed is:

1. A soft toric contact lens for correcting pure astigmatism or astigmatism combined with spherical sight defects, having a front face remote from the eye and a rear face facing the eye, wherein (a) the front face of the contact lens is of substantially rotationally symmetrical shape;

(b) the rear face of the contact lens is of toric shape in an optically active central region; and (c) the rear face is of aspherical shape in a peripheral region that surrounds the central region.

2. A contact lens according to claim 1, wherein the front face is provided in an upper and/or lower region with a flattened stabilisation zone for dynamic stabilisation of the orientation by blinking.

3. A contact lens according to claim 1, wherein especially in the case of positive total refractive power the front face is divided into an optically active central region and an adjacent rotationally symmetrical lenticular region.

4. A contact lens according to claim 1, wherein the optically active central region of the rear face has a mean diameter of from about 5 mm to about 14 mm and is of approximately oval shape.

5. A lens set comprising contact lenses according to any one of the preceding claims, wherein the toric central regions of the contact lens rear faces preferably have only two different cylindrical values, especially approximately minus 1 diopter and approximately minus 1.75 diopters.

6. A lens set according to claim 5, wherein the aspherical, peripheral regions of the contact lens rear faces preferably have only two geometries.

7. A contact lens according to claim 1, wherein said aspherical shape is ellipsoidal.

8. A lens set according to claim 6, wherein said aspherical shape is ellipsoidal.

9. A lens of claim 1 which is fabricated by molding the rear surface and lathing the front surface.

* * * * *